2,805,126

STABILIZED LIQUID SULPHUR TRIOXIDE

James R. Jones, Tonawanda, N. Y., assignor to Olin Mathieson Chemical Corporation, a corporation of Virginia No Drawing. Application July 12, 1955, Serial No. 521,637

2 Claims. (Cl. 23—174)

This invention relates to the stabilization of substantially pure liquid sulfur trioxide against polymerization.

On standing at room temperature, probably due to the presence of traces of moisture, liquid sulfur trioxide will polymerize to various forms which melt at about 17° C., 33° C. and 62° C. The mass becomes solid and may require temperatures of up to 100° C. to completely reliquefy it.

This property of $SO_3$ creates disadvantages in its shipping, storage and use. While these disadvantages may be overcome by, for example, the use of containers equipped with heating elements, this would incur considerable expense. Reliquefaction at elevated temperatures would also demand special containers capable of withstanding the high pressures of $SO_3$ at the higher temperatures.

It is the object of this invention to provide a chemical stabilizer, for liquid $SO_3$, with an effectiveness yet unattained in the art, that is, one which will prevent polymerization and not develop a precipitate, for indefinite periods of time at temperatures substantially below room temperature.

It has been proposed to use various boron compounds for stabilization of liquid $SO_3$. However, many do not completely stabilize but allow some sort of a precipitate to form. Among those stabilizers proposed as being less effective are the fluoborate salts, namely sodium and potassium fluoborates.

It has now been surprisingly discovered that a nonmetallic fluoborate, nitrosyl fluoborate, in contrast to other fluoborates, not only offers complete stabilization of liquid $SO_3$, but is effective in a lesser concentration than is required of other boron compounds. Furthermore, it possesses the additional advantage of having only to be added to the $SO_3$, no further treatment, such as heating, being required. This is also in contrast to other proposed boron stabilizers, after the addition of which at least a two hour heating period of the stabilized mixture is recommended.

According to this invention, nitrosyl fluoborate is added to liquid sulfur trioxide, and it is preferable to protect the so-stabilized mixture, as well as possible, from atmospheric moisture. This is advisable because the moisture will eventually cause the nitrosyl fluoborate to lose its effectiveness. The amount of stabilizer added depends on the amount of exposure to humidity which the stabilized material will face. I have found that as little as about 0.05 weight percent of nitrosyl fluoborate is completely effective in substantially pure $SO_3$ which is well sealed from the atmosphere. There is little reason to add more than about two weight percent of the nitrosyl fluoborate, as this would excessively contaminate the $SO_3$.

Nitrosyl fluoborate can be prepared by several known methods, for example, according to "Handbuch der Präparativen anorganischen Chemie" by Brauer, page 179, viz:

$$2HBF_4 + N_2O_3 \rightarrow 2NOBF_4 + H_2O$$

The following examples serve to illustrate the invention without limiting it in any way.

*Example I*

Sulfur trioxide (48.23 grams) was stabilized with 0.22 gm. of anhydrous $NOBF_4$ and sealed from the atmosphere in a glass bulb. The sample was quick frozen at 2° C., after which it melted sharply at 16°–17° C. It was then placed in a refrigerator at about −5° C. and kept frozen for 100 hours. The sample then melted completely to a water-clear liquid upon being immersed in a water bath at 16–17° C.

*Example II*

Sulfur trioxide (20.2 grams) was stabilized with 0.01 gram of anhydrous $NOBF_4$. The sample was treated exactly as described in Example I. It also melted completely at 16–17° C. after being removed from the refrigerator.

*Example III*

Sulfur trioxide (63.35 grams) was stabilized by the addition of 0.15 gram of $NOBF_4 \cdot H_2O$. The sample in a sealed glass tube was placed in a refrigerator at −10° C. for 24 hours. It was removed and placed in a water bath at 19° C. The sample melted completely to a water clear liquid. The tube was replaced in the refrigerator at −10° C. for an additional 72 hours. The sample then melted to the extent of about 95% when immersed in a water bath at 19° C.

These examples show that nitrosyl fluoborate, $NOBF_4$, and its hydrate $NOBF_4 \cdot H_2O$ are both effective stabilizers for liquid sulfur trioxide. By the use of term nitrosyl fluoborate in this specification and claims, I mean to include both the anhydrous and hydrated forms thereof. However, because it is somewhat more effective, I prefer the anhydrous form.

I claim:

1. Liquid sulfur trioxide containing admixed therewith nitrosyl fluoborate in amount effective to inhibit the polymerization of the liquid sulfur trioxide.

2. The composition of claim 1 wherein the amount of nitrosyl fluoborate is within the range from 0.05 to two percent by weight, based on the weight of the sulfur trioxide.

References Cited in the file of this patent

UNITED STATES PATENTS 2,458,718    McCann _____ Jan. 11, 1949